US010608767B2

(12) United States Patent
Ohmae et al.

(10) Patent No.: US 10,608,767 B2
(45) Date of Patent: Mar. 31, 2020

(54) WIRELESS COMMUNICATION DEVICE, WIRELESS INFORMATION COLLECTION SYSTEM, AND WIRELESS COMMUNICATION METHOD

(71) Applicant: OMRON Corporation, Kyoto (JP)

(72) Inventors: Soji Ohmae, Nara (JP); Manh Tai Nguyen, Kyoto (JP); Keisuke Saito, Suita (JP)

(73) Assignee: OMRON Corporation, Kyoto (JP)

( * ) Notice: Subject to any disclaimer, the term of this patent is extended or adjusted under 35 U.S.C. 154(b) by 189 days.

(21) Appl. No.: 15/744,836

(22) PCT Filed: Jan. 10, 2017

(86) PCT No.: PCT/JP2017/000398
§ 371 (c)(1),
(2) Date: Jan. 15, 2018

(87) PCT Pub. No.: WO2017/154327
PCT Pub. Date: Sep. 14, 2017

(65) Prior Publication Data
US 2018/0212697 A1    Jul. 26, 2018

(30) Foreign Application Priority Data

Mar. 9, 2016 (JP) .................................. 2016-045350

(51) Int. Cl.
*H04J 3/16* (2006.01)
*H04W 72/04* (2009.01)
(Continued)

(52) U.S. Cl.
CPC ........ *H04J 3/1694* (2013.01); *G05B 19/0426* (2013.01); *H04J 3/06* (2013.01);
(Continued)

(58) Field of Classification Search
CPC .... H04W 72/0446; H04W 84/12; H04W 4/04
See application file for complete search history.

(56) References Cited

U.S. PATENT DOCUMENTS

| 2003/0086387 A1* | 5/2003 | Matsui ..................... H04B 1/40 370/324 |
| 2009/0180465 A1 | 7/2009 | Closset et al. |

(Continued)

FOREIGN PATENT DOCUMENTS

| CN | 103907387 | 7/2014 |
| JP | H04199998 | 7/1992 |

(Continued)

OTHER PUBLICATIONS

"International Search Report (Form PCT/ISA/210) of PCT/JP2015/050312", dated Apr. 7, 2015, with English translation thereof, pp. 1-2.

(Continued)

*Primary Examiner* — Hassan Kizou
*Assistant Examiner* — Hector Reyes
(74) *Attorney, Agent, or Firm* — JCIPRNET

(57) ABSTRACT

A wireless communication device acquires, from a predetermined wireless slave device included in one or more wireless slave devices different from the wireless communication device, unrelated transmission information that is transmission information wirelessly transmitted to a master device, corresponding to the predetermined wireless slave device, in accordance with the predetermined time division multiple access scheme and that includes identification information identifying the predetermined wireless slave device, the unrelated transmission information being acquired at the time of the wireless transmission. On the basis of the identification information included in the unrelated transmission information, the acquisition time of the unrelated transmission information, and information relating (Continued)

to a transmission sequence, the wireless communication device determines a predetermined time slot for the wireless communication device to transmit the predetermined information to the master device corresponding thereto in accordance with the predetermined time division multiple access scheme; and transmits the predetermined information.

16 Claims, 11 Drawing Sheets

(51) Int. Cl.
*G05B 19/042* (2006.01)
*H04W 4/00* (2018.01)
*H04J 3/06* (2006.01)
*H04W 84/12* (2009.01)
*H04W 84/20* (2009.01)
*H04W 4/02* (2018.01)

(52) U.S. Cl.
CPC ......... *H04W 4/00* (2013.01); *H04W 72/0446* (2013.01); *G05B 2219/15117* (2013.01); *H04J 3/0652* (2013.01); *H04W 4/027* (2013.01); *H04W 84/12* (2013.01); *H04W 84/20* (2013.01)

(56) References Cited

U.S. PATENT DOCUMENTS

2010/0226342 A1* 9/2010 Colling ............... H04W 56/002
 370/336

2015/0050902 A1* 2/2015 Umeki .................... H04Q 9/00
 455/127.5
2017/0350615 A1* 12/2017 Ashar ................... H04W 84/20

FOREIGN PATENT DOCUMENTS

| JP | 2003143056 | 5/2003 |
| JP | 2006033070 | 2/2006 |
| JP | 2007006437 | 1/2007 |
| JP | 2009105626 | 5/2009 |
| JP | 4835802 | 12/2011 |
| JP | 2012195705 | 10/2012 |
| WO | 2008139830 | 11/2008 |

OTHER PUBLICATIONS

"International Preliminary Report on Patentability; this report contains the following items :Form PCT/ISA237(cover sheet), PCT/ISA237(Box No. I),PCT/ISA237(Box No. V)", dated Apr. 4, 2017, which is English translation of "Written Opinion of the International Searching Authority", pp. 1-6.
"Office Action of China Counterpart Application," dated Oct. 8, 2018, with English translation thereof, p. 1-p. 6.
"Notification of Reasons for Refusal of Japan Counterpart Application," dated Sep. 4, 2018, with English translation thereof, p. 1-p. 4.
"Search Report of Europe Counterpart Application", dated Sep. 4, 2019, pp. 1-7.

* cited by examiner

| WIRELESS SLAVE UNIT ID | TRANSMISSION SEQUENCE |
|---|---|
| WIRELESS SLAVE UNIT 1a:X001 | 1 |
| WIRELESS SLAVE UNIT 2a:X002 | 2 |
| WIRELESS SLAVE UNIT 3a:X003 | 3 |
| WIRELESS SLAVE UNIT 4a:X004 | 4 |

FIG. 4

WIRELESS COMMUNICATION DEVICE, WIRELESS INFORMATION COLLECTION SYSTEM, AND WIRELESS COMMUNICATION METHOD

CROSS-REFERENCE TO RELATED APPLICATION

This application is a 371 of international application of PCT application serial no. PCT/JP2017/000398, filed on Jan. 10, 2017, which claims the priority benefit of Japan application no. 2016-045350, filed on Mar. 9, 2016. The entirety of each of the abovementioned patent applications is hereby incorporated by reference herein and made a part of this specification.

TECHNICAL FIELD

The present invention relates to a wireless communication device that wirelessly transmits its own information to a master device thereof using a time-division multiple access system and a wireless information collection system including a plurality of sets of pairs having the wireless communication device and the master device thereof.

BACKGROUND ART

In order to appropriately collect information owned by terminals and the like through wireless communication, it is necessary to transmit and receive appropriate information between a transmission source and a transmission destination. For example, Patent Literature 1 discloses a technology which relates to information transmission between a master and a slave and automatically secures a substituent communication path between a master and some slaves thereof even in a case in which there is an obstacle between the master and the slaves that blocks synchronization therebetween. In the technology, the master regularly transmits a synchronization signal to each slave, and each slave returns a reception signal according to the reception of the synchronization signal to the master. In a case in which a reception signal corresponding to a synchronization signal has not been received for a predetermined time, the master determines that a slave associated with the reception signal is no longer visible and adjusts wireless transmission/reception such that a packet from the slave can be transmitted and received in a substituent path via another slave.

In addition, Patent Literature 2 discloses a technology in which, in a wireless communication network of a multi-hop type in which there is no master, each wireless device delivers time synchronization information to wireless devices having no established time synchronization due to presence of an obstacle between the wireless devices. More specifically, in a case in which information is to be transmitted from a certain wireless device (own device) to another wireless device, information relating to a time slot of the wireless device that is the own device is exchanged between detectable wireless devices before the transmission, and time synchronization for wireless transmission is established (a time slot for wireless transmission is determined). Accordingly, until the time synchronization is established, transmission and reception of a plurality of signals between wireless devices are necessary.

CITATION LIST

Patent Literature

[Patent Literature 1]
PCT Publication No. WO2008/139830
[Patent Literature 2]
Japanese Unexamined Patent Application Publication No. 2007-6437

SUMMARY OF INVENTION

Technical Problem

For the implementation of wireless control of control devices in an FA field of a manufacturing site or the like, high speed and high reliability of wireless communication are required. For example, in a manufacturing site, in order to appropriately check the manufacturing state, control devices such as many sensors and the like are installed with a high density. When wireless devices are installed on such control devices for collecting information that is, for example, acquired or generated by the control devices, many communication channels to be assigned to the wireless devices are necessary. Meanwhile, since there is a limitation on the number of communication channels, a wireless communication technology according to a time-division multiple access system is used. By executing time division of communication using this technology, the number of wireless devices installed on control devices can be increased as much as possible. Generally, in a case in which such time division communication is executed, it is necessary to synchronize communication time periods such that wireless communication among wireless devices is not interfered with.

However, in the FA field, there may be a timing at which a robot changing its posture, a moving conveying device, or the like is interposed between wireless devices as an obstacle. When communication for synchronization for the time division communication is blocked by such an obstacle, and the communication time periods cannot be synchronized due to the influence of shadowing, interference in the wireless communication occurs, and high speed and high reliability of wireless communication cannot be secured. According to the conventional technology described above, it is possible to alleviate the influence of obstacles through securement of a substituent path or exchange of information with other wireless devices. However, for such alleviation, a new slave or exchange of information with other wireless devices is necessary, and a relatively long time is required. As a result, in the FA field in which high speed and high reliability are require, it cannot be said that the problem is sufficiently solved.

The present invention is made in consideration of such problems, and an object thereof is to provide a wireless communication technology enabling information collection through wireless communication having high speed and high reliability in an FA field.

Solution to Problem

According to the present invention, in order to solve the problems described above, a configuration in which a wireless communication device configured to wirelessly communicate with a master unit in accordance with a predetermined time-division multiple access system acquires transmission information between another wireless slave unit and a master unit that execute wireless communication in accordance with the same predetermined time-division multiple access system as that of the device, in other words, a configuration in which the wireless communication device intercepts transmission information between another wireless slave unit and the master unit thereof that is executed regardless of the device is intercepted. By determining a time slot used for the wireless communication of the own device (the device) by using the transmission information acquired in this way, a time required for the determination can be shortened, and interferences in the wireless communication can be avoided, whereby information collection using high-speed and high-reliability wireless communication can be executed.

In more details, according to the present invention, there is provided a wireless communication device that is configured to wirelessly transmit predetermined information included in the own device to a master unit corresponding to the own device at a predetermined transmission period, the wireless transmission being executed according to a predetermined time-division multiple access system, the wireless communication device including: an information maintaining unit that maintains transmission sequence information of one or a plurality of wireless slave units configured to wirelessly transmit information included in the one or plurality of wireless slave units to master units corresponding to the one or plurality of wireless slave units from the one or plurality of wireless slave units other than the wireless communication device in accordance with a predetermined time-division multiple access system and the wireless communication device relating to sequences of wireless transmission in the predetermined time-division multiple access system; an acquisition unit that acquires information that is transmission information wirelessly transmitted from a predetermined wireless slave unit included in the one or plurality of wireless slave units to a master unit corresponding to the predetermined wireless slave unit in accordance with the predetermined time-division multiple access system and is non-related transmission information including identification information used for identifying the predetermined wireless slave unit when the wireless communication is executed; a time slot determining unit that determines a predetermined time slot used for the wireless communication device to transmit the predetermined information to a master unit corresponding to the own device in accordance with the predetermined time-division multiple access system on the basis of the identification information included in the non-related transmission information acquired by the acquisition unit, acquisition time of the non-related transmission information, and the transmission sequence information maintained by the information maintaining unit; and a transmission unit that transmits the predetermined information to the master unit corresponding to the own device in the predetermined time slot determined by the time slot determining unit.

The wireless communication device according to the present invention is configured to periodically transmit predetermined information to the master unit thereof, and the periodical transmission is executed in accordance with the predetermined time-division multiple access system. Accordingly, in a time other than the time slot assigned for wireless transmission of the wireless communication device, communication devices other than the wireless communication device, in other words, the one or plurality of wireless slave units can execute wireless communication for each of the master units. In this way, in wireless transmission (hereinafter, also referred to as "predetermined wireless transmission") according to a predetermined time-division multiple access system, the wireless communication device and one or a plurality of wireless slave units are involved. Thus, transmission sequence information relating to the sequence of the predetermined wireless transmission is maintained by the information maintaining unit such that there is no interference in the wireless transmission. Here, the transmission sequence information may be fixed information (in other words, information of a case in which devices, wireless slave units, and the like involved or to be involved in the predetermined wireless transmission are determined in advance) or variable information (information of a case in which devices, wireless slave units, and the like involved in the predetermined wireless transmission are timely changed.

Here, in the wireless communication device according to the present invention, in a case in which predetermined information included in the own device is to be transmitted to a master unit, when synchronization with other wireless slave units involving in the predetermined wireless transmission is taken, in other words, when a time slot in which the own device can execute wireless transmission is determined, a synchronization process is not directly executed for the other wireless slave units. The reason for this is that, in a case in which a synchronization process is directly executed for the other wireless slave units, before the own device executes wireless transmission, necessarily, it is required to execute transmission/reception of signals to/from other wireless slave units, and a relatively long time is required for determining a time slot, whereby high-speed wireless transmission is inhibited.

Thus, in the wireless communication device according to the present invention, the acquisition unit acquires the non-related transmission information. This non-related transmission information is transmission information that is wirelessly transmitted by a wireless slave unit (predetermined wireless slave unit) other than the wireless communication device to the master unit of the predetermined wireless slave unit and is transmission information not relating to wireless transmission between the wireless communication device and the master unit. Accordingly, the acquisition executed by the acquisition unit is not in a form in which the information that is wirelessly transmitted from the predetermined wireless slave unit with the wireless communication device designated as a transmission destination but is in the form in which information executed regardless of the intention of the wireless transmission between both parties is received when wireless communication is executed between the predetermined wireless slave unit and the master unit and may be literally represented as referring to or intercepting the information that is wirelessly transmitted. For this reason, the acquisition executed by the acquisition unit is unidirectional acquisition of information not accompanying a specific process (signal processing for checking synchronization or the like) from the wireless communication device toward the predetermined wireless slave unit. In addition, the predetermined wireless slave unit does not need to be a specific wireless slave unit among one or a plurality of wireless slave units and may be any one wireless slave unit thereof.

In the non-related transmission information acquired by the acquisition unit, identification information used for identifying a predetermined wireless slave unit that is a transmission source transmitting the information is included. For this reason, when the non-related transmission information is acquired, the wireless communication device according to the present invention can determine the wireless slave unit that has wirelessly transmitted the non-related transmission information (in other words, one of the one or plurality of wireless slave units that corresponds to the predetermined wireless slave unit). Thus, the time slot determining unit can determine a predetermined time slot in which the own device can transmit predetermined information in the predetermined wireless transmission on the basis of a correlation relating to the transmission sequence between the predetermined wireless slave unit identified from the identification information included in the non-related transmission information and the own device (wireless communication device) in the transmission sequence information included in the information maintaining unit and the acquisition time of the non-related transmission information, in other words, the time that can be regarded as the transmission time of the predetermined wireless slave unit. In other words, in the predetermined wireless transmission, the transmission sequence of the own device for the predetermined wireless slave unit is set in the transmission sequence information, and accordingly, by using the correlation relating to the transmission sequence, a predetermined time slot can be determined. At this time, the non-related transmission information does not necessarily need to be acquired from each of the plurality of wireless slave units.

Then, by using the predetermined time slot determined by the time slot determining unit, the wireless communication device can transmit the predetermined information to the master unit thereof in accordance with the predetermined time-division multiple access system without interfering with the other wireless slave units. In this way, the wireless communication device according to the present invention determines a predetermined time slot used for wirelessly transmitting the predetermined information by using the non-related transmission information that is uni-directionally acquired by the acquisition unit. For this reason, the high speed of the wireless transmission can be appropriately maintained. In addition, as described above, the predetermined wireless slave unit may be one of one or a plurality of wireless slave units. Accordingly, even when non-related transmission information corresponding to the one wireless slave unit cannot be acquired, in a case in which non-related transmission information corresponding to any other wireless slave unit can be acquired, a predetermined time slot can be determined. Accordingly, predetermined wireless transmission from the wireless communication device can be appropriately maintained, which contributes to the reliability of the predetermined wireless transmission.

In addition, in the wireless communication device according described above, the non-related transmission information may be transmission information in which the master unit corresponding to the own device is not set as a transmission destination. In addition, as a different method, the wireless communication device may be configured to have a master unit that is a transmission destination of the wireless transmission according to the predetermined time-division multiple access system to be common with at least one wireless slave unit among the one or plurality of wireless slave units. In this case, in the non-related transmission information, a master unit corresponding to the own device may be set as the transmission destination, and the acquisition unit may acquire the non-related transmission information transmitted from the at least one wireless slave unit to the common master in accordance with the predetermined time-division multiple access system. In any form thereof, the non-related transmission information is not information that is wirelessly transmitted from the predetermined wireless slave unit to the wireless communication device with the wireless communication device designated as the transmission destination.

Here, in the wireless communication device described above, after the time slot determining unit determines the predetermined time slot, the transmission unit may transmit the predetermined information to the master unit corresponding to the own device in the predetermined time slot within one cycle of the predetermined transmission period of the own device. In other words, in a cycle immediately after the determination of the predetermined time slot executed by the time slot determining unit, predetermined wireless transmission according to the predetermined time slot is executed. Accordingly, interferences in the predetermined wireless transmission can be avoided, and improvement in the reliability of wireless transmission can be achieved.

In addition, in the wireless communication device described until now, an internal timer unit that counts time within the own device may be further included. Then, the acquisition time of the non-related transmission information is set as time acquired by counting the acquisition time of the non-related transmission information acquired by the acquisition unit by using the internal timer unit. Then, the time slot determining unit may recognize the predetermined wireless slave unit that is a transmission source of the non-related transmission information on the basis of the identification information included in the non-related transmission information and determine the predetermined time slot within the predetermined transmission period of the own device that is counted by the internal timer unit on the basis of a correlation between the predetermined wireless slave unit and the own device in the transmission sequence information and the acquisition time. In this way, while the wireless communication device determines the predetermined time slot by using the time counted by the internal timer unit, as described above, by using the transmission sequence information, the predetermined time slot of the own device can be determined as an appropriate time slot in which interference in the wireless communication does not occur.

In addition, the wireless communication device described above may further include a substitution determining unit that determines a substitution transmission timing for the wireless communication device to transmit the predetermined information to the master unit corresponding to the own device substituting the predetermined time slot on the basis of the time counter by the internal timer unit in a case in which all the non-related transmission information of the one or plurality of wireless slave units cannot be acquired by the acquisition unit in one cycle of the predetermined transmission period of the own device. As described above, the predetermined wireless slave unit is one wireless slave unit among one or a plurality of wireless slave units, and accordingly, when non-related transmission information from any one of the wireless slave units can be acquired, a predetermined time slot can be determined. However, due to the surrounding environments or the like of the wireless communication device, theoretically, there may be a case in which non-related transmission information cannot be acquired from any one of the wireless slave units. In such a case, instead of the predetermined time slot, wireless transmission according to a substitution transmission timing determined by the substitution determining unit is executed. This substitution transmission timing is determined on the basis of time counted by the internal timer unit, and, for example, a timing acquired by counting a time elapse corresponding to a predetermined period using the internal timer unit by using the predetermined time slot used for the predetermined wireless transmission in the previous cycle as a reference may be the substitution transmission timing. Accordingly, even in a case in which a predetermined time slot cannot be determined, predetermined information can be wirelessly transmitted with relatively high reliability.

Here, in the wireless communication device described until now, in a case in which information relating to the predetermined wireless slave unit recognized on the basis of the identification information included in the non-related transmission information acquired by the acquisition unit is not included in the transmission sequence information that is already included in the information maintaining unit, the information maintaining unit may update the transmission sequence information on the basis of the acquired non-related transmission information and maintain the transmission sequence information after the update. By updating the transmission sequence information in this way, even when the wireless slave unit involved in the predetermined wireless transmission is changed, the wireless communication device can maintain wireless transmission having high speed and high reliability.

Here, by determining a predetermined time slot using the time slot determining unit as described until now and transmitting the predetermined information, interferences in the wireless communication can be avoided. However, in a wireless slave unit group according to the predetermined time-division multiple access system including the own device, when a time deviation in the internal timer occurs, even when wireless transmission is executed in accordance with the determined predetermined time slot, it may be difficult to sufficiently avoid interferences in the wireless communication. Thus, it may be considered to avoid the interferences by setting a guard time in which wireless communication is not executed within the predetermined time slot.

In addition, the present invention may be perceived from a viewpoint of a wireless information collection system that includes a plurality of sets of a wireless communication combination, which is configured to wirelessly transmit predetermined information included in an own device to a master unit corresponding to the own device at a predetermined period, formed by a wireless communication device and a master unit thereof, the wireless transmission being executed in accordance with a predetermined time-division multiple access system. In such a case, each wireless communication device of the plurality of sets includes: an information maintaining unit that maintains transmission sequence information of one or a plurality of wireless slave units configured to wirelessly transmit information included in the one or plurality of wireless slave units to master units corresponding to the one or plurality of wireless slave units from the one or plurality of wireless slave units other than the wireless communication device in accordance with a predetermined time-division multiple access system and the wireless communication device relating to sequences of wireless transmission in the predetermined time-division multiple access system; an acquisition unit that acquires information that is transmission information wirelessly transmitted from a predetermined wireless slave unit included in the one or plurality of wireless slave units to a master unit corresponding to the predetermined wireless slave unit in accordance with the predetermined time-division multiple access system and is non-related transmission information including identification information used for identifying the predetermined wireless slave unit when the wireless communication is executed; a time slot determining unit that determines a predetermined time slot used for the wireless communication device to transmit the predetermined information to a master unit corresponding to the own device in accordance with the predetermined time-division multiple access system on the basis of the identification information included in the non-related transmission information acquired by the acquisition unit, acquisition time of the non-related transmission information, and the transmission sequence information maintained by the information maintaining unit; and a transmission unit that transmits the predetermined information to the master unit corresponding to the own device in the predetermined time slot determined by the time slot determining unit. In addition, each master unit of the plurality of sets includes a master unit-side transmission unit that transmits the predetermined information that is wirelessly transmitted from the wireless communication device corresponding to the master unit to a predetermined information processing device. In addition, the technical idea disclosed in relation with the invention of the wireless communication device can be applied to the invention of the wireless information collection system as long as any technical deviation does not occur.

In addition, the present invention may be perceived from a viewpoint of a wireless transmission method for wirelessly transmitting predetermined information included in a wireless communication device to a master unit corresponding to the own device at a predetermined transmission period. In such a case, the wireless transmission is executed according to a predetermined time-division multiple access system, and the wireless communication device maintains transmission sequence information of one or a plurality of wireless slave units configured to wirelessly transmit information included in the one or plurality of wireless slave units to master units corresponding to the one or plurality of wireless slave units from the one or plurality of wireless slave units other than the wireless communication device in accordance with a predetermined time-division multiple access system and the wireless communication device relating to sequences of wireless transmission in the predetermined time-division multiple access system. Then, the wireless transmission method described above includes: acquiring information that is transmission information wirelessly transmitted from a predetermined wireless slave unit included in the one or plurality of wireless slave units to a master unit corresponding to the predetermined wireless slave unit in accordance with the predetermined time-division multiple access system and is non-related transmission information including identification information used for identifying the predetermined wireless slave unit when the wireless communication is executed; determining a predetermined time slot used for the wireless communication device to transmit the predetermined information to a master unit corresponding to the own device in accordance with the predetermined time-division multiple access system on the basis of the identification information included in the acquired non-related transmission information, acquisition time of the non-related transmission information, and the transmission sequence information maintained by the information maintaining unit; and transmitting the predetermined information to the master unit corresponding to the own device in the determined predetermined time slot determined. In addition, the technical idea disclosed in relation with the invention of the wireless communication device can be applied to the invention of the wireless transmission method as long as any technical deviation does not occur.

Advantageous Effects of Invention

A wireless communication technology enabling information collection through wireless communication having high speed and high reliability in an FA field can be provided.

BRIEF DESCRIPTION OF DRAWINGS

FIG. 4 illustrates the data structure of transmission sequence information included in a wireless communication device according to the present invention.

DESCRIPTION OF EMBODIMENTS

Embodiment 1

Figure 1:
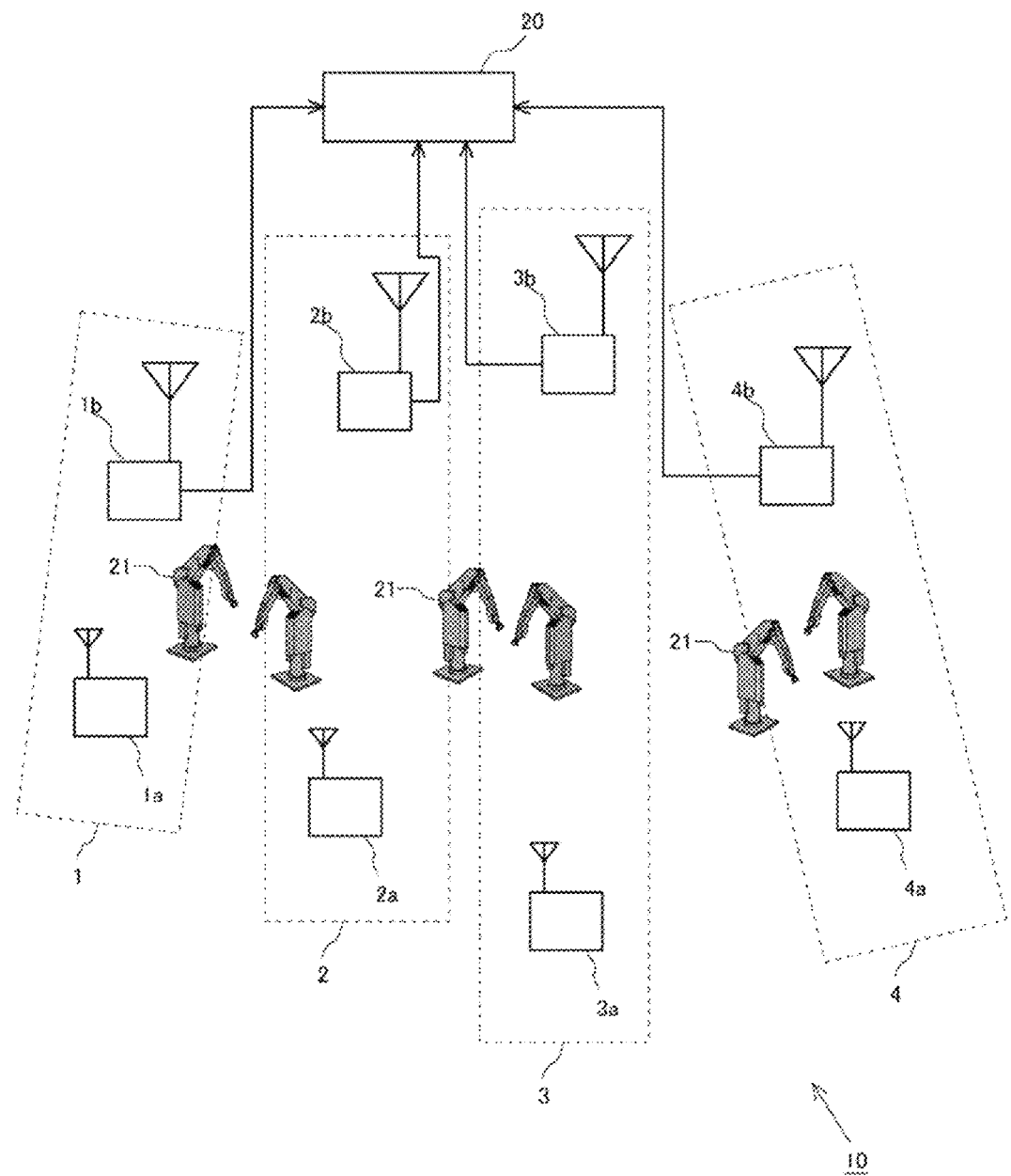
FIG. 1 is a first diagram illustrating a schematic configuration of a wireless information collection system including a wireless communication device according to the present invention.

A wireless information collection system (which may be simply referred to hereinafter as a "system") 10 according to the present invention and information collection pairs 1 to 4 and an information processing device 20 included in the system will be described with reference to the drawings. The configurations of the following embodiments are examples, and the present invention is not limited to the configurations of the embodiments. FIG. 1 is a diagram illustrating a schematic configuration of a system 10 used in a factory automation (FA) field of a factory or the like and the arrangement of a plurality of information collection pairs 1 to 4 and an information processing device 20 included therein. In more detail, in an area in which the system 10 is formed, robot groups 21 and conveying devices disposed inside a factory are arranged, and predetermined products are manufactured by the robot group. Various kinds of information relating to the product manufacturing (for example, information relating to the passage of components and environment parameters (temperatures, vibration, and the like) representing the states of the manufacturing devices) is collected in the information processing device 20 by the information collection pairs 1 to 4. The driving control of the robot groups 21 for manufacturing products is not essential to the present invention, and thus detailed description thereof will not be presented.

Here, an information collection pair will be described using the information collection pair 1 as an example. Thus, basically, the following description relating to the information collection pair 1 can be applied to the other information collection pairs as well. The information collection pair 1 includes a wireless slave unit $1a$ corresponding to an information communication device according to the present invention and a master unit $1b$. In the wireless slave unit $1a$, sensors detecting various kinds of information in a manufacturing area in which the system 10 is arranged are mounted. For example, there are a proximity sensor used for detecting the passage or proximity of components in a manufacturing line and sensors used for measuring the environment parameters (temperature, humidity, acceleration, and the like) thereof as examples thereof. Information (measured information) measured by the mounted sensors is wirelessly transmitted from the wireless slave unit $1a$ to the master unit $1b$. The master unit $1b$ is connected to the information processing device 20 using wires, and the measured information transmitted from the wireless slave unit $1a$ is collected in the information processing device 20 through the wired circuit and is provided for a predetermined process therein. Here, as sensors mounted in the wireless slave unit $1a$, in addition to the proximity sensor described above, for example, there are physical sensors such as a temperature sensor, a humidity sensor, an illuminance sensor, a flow sensor, a pressure sensor, a soil temperature sensor, and a particle sensor and chemical sensors such as $CO_2$ sensor, a pH sensor, an EC sensor, and a soil moisture sensor.

In this way, in the information collection pair 1, wireless communication according to a predetermined time-division multiple access system (which may also be simply referred to hereinafter as "wireless communication") is executed between the wireless slave unit $1a$ and the master unit $1b$. This predetermined time-division multiple access system is a wireless communication system used for time-division wireless communication for periodical information collection by using an information collection pair included in the system. Accordingly, specifications such as a transmission period, a transmission sequence, and the like of wireless communication according to a predetermined time-division multiple access system are determined such that interference of wireless communication does not occur in each information collection pair. In addition, determination of timings (time slots) at which wireless transmission from the wireless slave unit $1a$ to the master unit $1b$ is performed according to the predetermined time-division multiple access system will be described later in detail.

In the system 10 configured in this way, measured information is acquired by the wireless slave units $1a$ to $4a$ included in the information collection pairs 1 to 4, and the measured information is wirelessly transmitted to corresponding master units $1b$ to $4b$. Then, the measured information transmitted to each master unit is collected in the information processing device 20 to which each master unit is connected. Here, as described above, because the wireless communication between the wireless slave unit and the master unit of the information collection pair employs a predetermined time-division multiple access system, it is important to determine time slots for the wireless communication such that the wireless communication between the information collection pairs is not interfered with. Generally, synchronized communication is executed for determining a time slot used for wireless communication, but in a case in which there is a robot group 21 changing its posture, a moving conveying device, or the like in an area in which wireless communication is executed as in the system 10, such objects may be obstacles to the wireless communication. For this reason, when synchronized communication is blocked by such obstacles, and the communication time periods cannot be synchronized due to the influence of shadowing, interference of the wireless communication occurs, and high speed and high reliability of the wireless communication cannot be secured.

Figure 2:
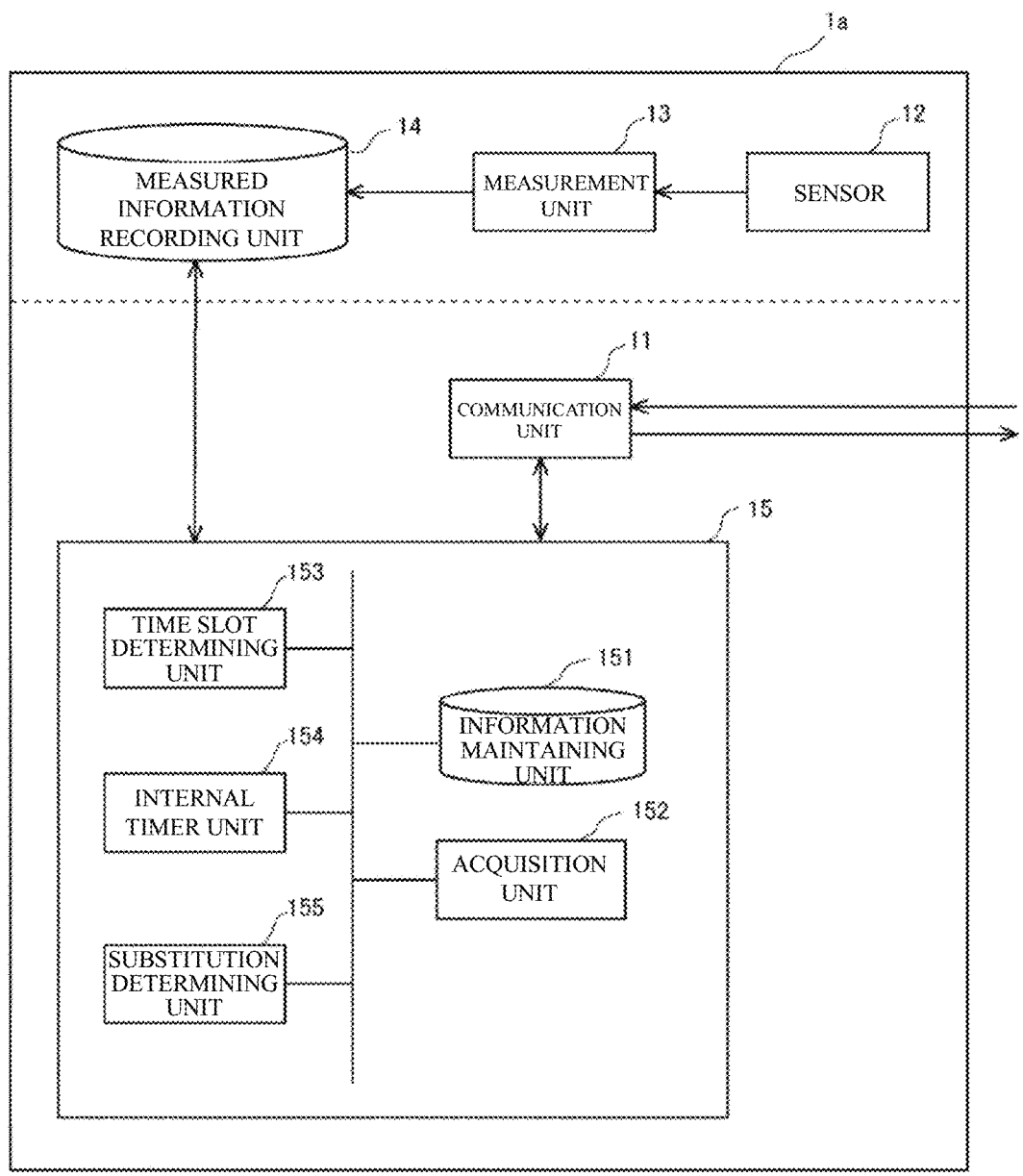
FIG. 2 is a functional block diagram of a wireless communication device according to the present invention.

Thus, in this embodiment, the determination of a time slot in which wireless communication from a wireless slave unit to a master unit is permitted, which enables the securement of high speed and high reliability of wireless communication in an information collection pair, will be described later. FIG. 2 is a functional block diagram of the wireless slave unit 1a enabling the determination of time slots. The wireless slave unit 1a includes an arithmetic operation device, a memory, and the like, and by executing a predetermined control program using the arithmetic operation device, not only a wireless communication function but also various functions are exhibited. The functional block diagram illustrated in FIG. 2 illustrates functions included in the wireless slave unit 1a as an image. Since the other wireless slave units 2a to 4b basically have the same functions, in this embodiment, the functional block diagram of the wireless slave unit 1a is representatively illustrated in FIG. 2.

The wireless slave unit 1a includes a communication unit 11, a measurement unit 13, a measured information recording unit 14, and a control unit 15 as functional units. Hereinafter, each functional unit included in the wireless device 1 will be described. First, the control unit 15 is a functional unit that is responsible for various kinds of control in the wireless device 1, and particularly includes an information maintaining unit 151, an acquisition unit 152, a time slot determining unit 153, an internal timer unit 154, and a substitution determining unit 155. The information maintaining unit 151 is a functional unit that maintains information relating to a wireless slave unit included in each information collection pair participating in the system 10. The information is transmission sequence information relating to a transmission sequence for transmitting measured information included in the wireless slave unit from the wireless slave unit to the master unit through wireless communication according to a predetermined time-division multiple access system in the system 10. A specific configuration of the information will be described later with reference to FIG. 4.

The acquisition unit 152 is a functional unit that acquires non-related transmission information that is measured information (in other words, information measured by the wireless slave unit 2a) transmitted by a wireless slave unit (a wireless slave unit corresponding to a predetermined wireless slave unit according to the present invention, for example, the wireless slave unit 2a) other than the own device (the wireless slave unit 1a) to the master unit thereof (for example, the master unit 2b) and is information including identification information of the wireless slave unit 2a that is a predetermined wireless slave unit. This non-related transmission information is information not relating to information transmitted by the own device (the wireless slave unit 1a) to the master unit 1b thereof and is information of which the transmission destination is not the own device (the wireless slave unit 1a). Accordingly, the acquisition of the non-related transmission information executed by the acquisition unit 152 is not an operation corresponding to the reception of information at a transmission destination (or the master unit thereof) to which the information is originally to be transmitted from a transmission source (predetermined wireless slave unit) and may be regarded as an operation of interception or reference that is executed by a wireless slave unit that is not the original transmission destination in the process of transmission of the information.

Next, the time slot determining unit 153 is a functional unit that determines a time slot used by the own device (the wireless slave unit 1a) for wirelessly transmitting the measured information to the master unit 1b on the basis of the identification information of a wireless slave unit other than the own device, the acquisition time, and the transmission sequence information maintained by the information maintaining unit 151 that are included in the non-related transmission information acquired by the acquisition unit 152. Since a wireless slave unit included in an information collection pair participating in the system 10 wirelessly transmits measured information to the master unit thereof periodically through wireless communication according to a predetermined time-division multiple access system, the time slot determining unit 153 determines a time slot for the own device (the wireless slave unit 1a) such that no interference occurs in the wireless communication between information collection pairs. Details of specific determination of a time slot will be described later. In addition, the internal timer unit 154 is a functional unit that counts the time inside the own device (the wireless slave unit 1a). The time according to the internal timer unit 154 is not synchronized with other wireless slave units and is independently counted. In addition, the substitution determining unit 155 is a functional unit that determines a substitution timing at which the own device (the wireless slave unit 1a) wirelessly transmits the measured information in a case in which the determination of a time slot using the time slot determining unit 153 cannot be executed. In the determination of a time slot using the time slot determining unit 153, the non-related transmission information acquired by the acquisition unit 152 is used, in a case in which the acquisition is not executed satisfactorily, there are cases in which it is difficult to determine a time slot. Even in such cases, a substitution timing is determined using the substitution determining unit 155 such that measured information can be wirelessly transmitted using the own device (the wireless slave unit 1a).

Next, the measurement unit 13 is a functional unit that executes measurement through the sensor 12. The measured information measured by the measurement unit 13 is stored as needed inside a memory by the measured information recording unit 14 under direction of the control unit 15. This measured information recording unit 14 is formed to interact with the control unit 15, and in accordance with a direction from the control unit 15, the recorded measured information is delivered to the control unit 15, and transmission information for the master unit 1b is generated. In this transmission information, in addition to the measured information, identification information of the own device (the wireless slave unit 1a) that is a transmission source is included such that the transmission source can be identified.

The communication unit 11 is a functional unit that executes communication with the outside of the wireless slave unit 1a, in other words, transmission/reception of information. More specifically, the communication unit 11 is formed to interact with the control unit 15. As a result, the communication unit 11 not only participates in the transmission of the transmission information generated based on the recorded measured information to the master unit 1b but also participates in the reception for the acquisition of the non-related transmission information using the acquisition unit 152.

<Transmission Process>

Figure 3:
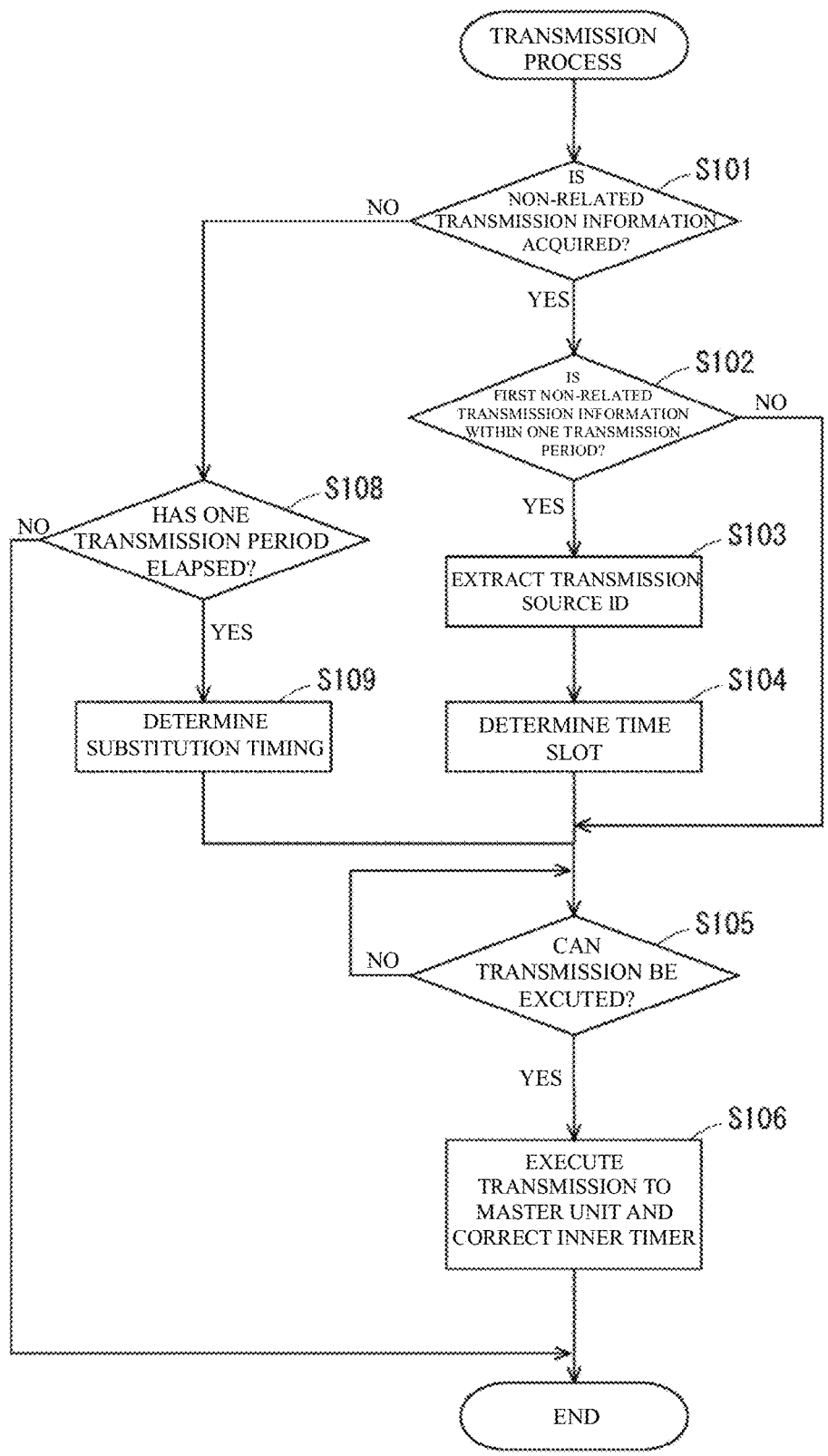
FIG. 3 is a flowchart of a transmission process executed by a wireless communication device according to the present invention.

A transmission process for collecting measured information using the information collection pair including the wireless slave unit configured as illustrated in FIG. 2, in other words, a transmission process of the transmission information for the master unit that is executed by the wireless slave unit in the information collection pair, will be described with reference to FIGS. 3 and 4. Between the information collection pairs participating in the system 10, wireless communication from the wireless slave unit included in each pair is executed in accordance with a time slot determined by the time slot determining unit 153 included in each wireless slave unit such that wireless communication is not interfered with when the wireless communication is executed using a predetermined time-division multi access system. The transmission process relating to the flowchart illustrated in FIG. 3 is a process of executing wireless transmission of transmission information according to a time slot determined by the time slot determining unit 153 and is realized by the control unit 15 executing a predetermined control program in the wireless slave unit. In the description of the transmission process illustrated in FIG. 3, the process is assumed to be executed in the wireless slave unit 1a as an example.

First, in S101, it is determined whether or not non-related transmission information is acquired by the acquisition unit 152. This non-related transmission information is acquired by the acquisition unit 152 acquiring (intercepting or referring to) the transmission information transmitted from a wireless slave unit other than the own device (the wireless slave unit 1a) (at least one wireless slave unit among the wireless slave units 2a to 4a) to the master unit thereof. In a case in which "Yes" is determined in S101, the process proceeds to S102. On the other hand, in a case in which "No" is determined in S101, the process proceeds to S108. Then, in S102, it is determined whether or not the non-related transmission information determined to be acquired in S101 is first non elated transmission information within one transmission period of the own device (the wireless slave unit 1a) after the transmission information is previously transmitted. In a case in which "Yes" is determined in S101, the process proceeds to S103 and S104. On the other hand, in a case in which "No" is determined in S102, the process proceeds to S105. S103 and S104 are processes relating to the determination of a time slot that is executed by the time slot determining unit 153. Accordingly, the processes relating to the determination of a time slot are executed only when "Yes" is determined in S102, in other words, when the first non-related transmission information within one transmission period of the own device (the wireless slave unit 1a) is acquired.

Thus, in S103, the identification information of the wireless slave unit that is the transmission source that has transmitted the first non-related transmission information that is included in the first non-related transmission information within one transmission period of the own device (the wireless slave unit 1a) is extracted. For example, in a case in which the first non-related transmission information has been transmitted by the wireless slave unit 2a, the identification information of the wireless slave unit 2a included therein is extracted. In accordance with this extraction, the own device (the wireless slave unit 1a) can recognize that the non-related transmission information has been acquired from the wireless slave unit 3a among the information collection pairs participating in the system 10. When the process of S103 ends, the process proceeds to S104.

In S104, a time slot used when the own device (the wireless slave unit 1a) wirelessly transmits the transmission information using a predetermined time-division multiple access system next time is determined on the basis of the acquisition time of the first non-related transmission information, the identification information of the wireless slave unit 2a that is the transmission source extracted in S103, and the transmission sequence information included in the information maintaining unit 151. Here, the acquisition time of the first non-related transmission information is a time when the first non-related transmission information is acquired by the acquisition unit 152 and is a time specified by the counting of the internal timer unit 154 of the own device (the wireless slave unit 1a). In addition, the configuration of the transmission sequence information included in the information maintaining unit 151 is illustrated in FIG. 4. In the transmission sequence information, the identification information of each wireless slave unit included in four information collection pairs participating in the system 10 and the transmission sequence are associated with each other. In the example illustrated in FIG. 4, in order to enable the avoidance of interference of the wireless communication in the system 10, the wireless transmission is determined to be time-divisionally executed in order of the wireless slave units 1a, 2a, 3a, and 4a. In addition, after the wireless slave unit 4a set in the final sequence, the wireless slave unit 1a that is set in the first sequence continues.

Here, the transmission period in the wireless communication using a predetermined time-division multiple access system is 40 msec, and this time corresponds to 40 clocks according to the counting of the internal timer unit 154. According to the transmission sequence information illustrated in FIG. 4, for the wireless slave unit 2a that has transmitted the first non-related transmission information, the own device (the wireless slave unit 1a) executes wireless transmission next at the third time after the wireless slave units 3a and 4a. Thus, in a case in which the time when the wireless slave unit 2a transmitted the first non-related transmission information is regarded as the time when the first non-related transmission information was acquired, a time slot for executing wireless transmission as a third wireless slave unit is determined by the time slot determining unit 153. In the system 10, wireless transmission using four wireless slave units is executed using a predetermined time-division multiple access system, and a time slot of a maximum length of 10 msec (a length corresponding to 10 clocks) can be assigned to one wireless slave unit. Thus, a period of 10 msec (corresponding to 10 clocks) starting from time after 30 msec (corresponding to 30 clocks) that is a length of time slots corresponding to three wireless slave units with the acquisition time of the first non-related transmission information from the wireless slave unit 2a as a reference is determined as a time slot for the wireless transmission of the own device by the time slot determining unit 153. In addition, the start time of the time slot determined by the time slot determining unit 153 is regarded as the starting point of the counting of the internal timer unit 154 of the own device (the wireless slave unit 1a) (see the process of S106 to be described later). Accordingly, in a case in which the starting point of the counting of the internal timer unit 154 deviates, it is corrected when the determination of a time slot is executed by the time slot determining unit 153. When the process of S104 ends, the process proceeds to S105.

In addition, after the process proceeds to S108 after "No" is determined in S101, in S108, it is determined whether or not one transmission period of the own device (the wireless slave unit 1a) has elapsed after the previous transmission of the transmission information. In other words, in S108, it is determined whether or not non-related transmission information could not be acquired from any wireless slave unit within the one transmission period. In a case in which "Yes" is determined in S108, the process proceeds to S109. On the other hand, in a case in which "No" is determined, this transmission process ends. Accordingly, in a case in which non-related transmission information could not be acquired from other wireless slave units in one transmission period in the own device (the wireless slave unit 1a), the process of S109 is executed. Then, in S109, the determination of a substitution timing is executed by the substitution determining unit 155. The substitution timing is a transmission timing that is determined to be substitutive for the wireless transmission of the next transmission information in a case in which the determination of a time slot cannot be executed using the time slot determining unit 153 of the own device (the wireless slave unit 1a). In the case of this embodiment, the starting point is set as a substitutive timing based on the correction of the starting point of the counting of the internal timer unit 154 described above. When the process of S109 ends, the process proceeds to S105.

In S105, based on the determination of a time slot in S104 or the determination of a substitutive timing in S109, it is determined whether or not it arrives at the determined timing and the transmission of the transmission information can be executed. Here, the arrival at the timing is determined in accordance with the counting of the internal timer unit 154. In a case in which "Yes" is determined in S105, the process proceeds to S106, wireless transmission of the transmission information toward the master unit 1b is executed through the communication unit 11, and the starting point of the counting using the internal timer unit 154 described above is corrected, and this transmission process ends. On the other hand, in a case in which "No" is determined in S105, the determination process of S105 is executed again.

In the transmission process executed in this way, a time slot used by the own device (the wireless slave unit 1a) for the transmission of the transmission information is determined on the basis of non-related transmission information acquired by the acquisition unit 152. This non-related transmission information is information that is transmitted periodically from wireless slave units other than the own device to the master device thereof and is information not transmitted according to a request from the own device but is passively acquired by the own device. For this reason, the acquisition of the non-related transmission information is relatively easy, and a time required for the acquisition thereof is very short. Even if the non-related transmission information cannot be acquired within one transmission period, wireless transmission is executed at a timing that is determined substitutive, and accordingly, it can be avoided that the collection of measured information is inhibited as much as possibly. From such a viewpoint, the transmission process illustrated in FIG. 3 enables information collection through wireless communication having high speed and high reliability, particularly, in the FA field.

<Flow of Wireless Transmission of Transmission Information in System 10>

Figure 5:
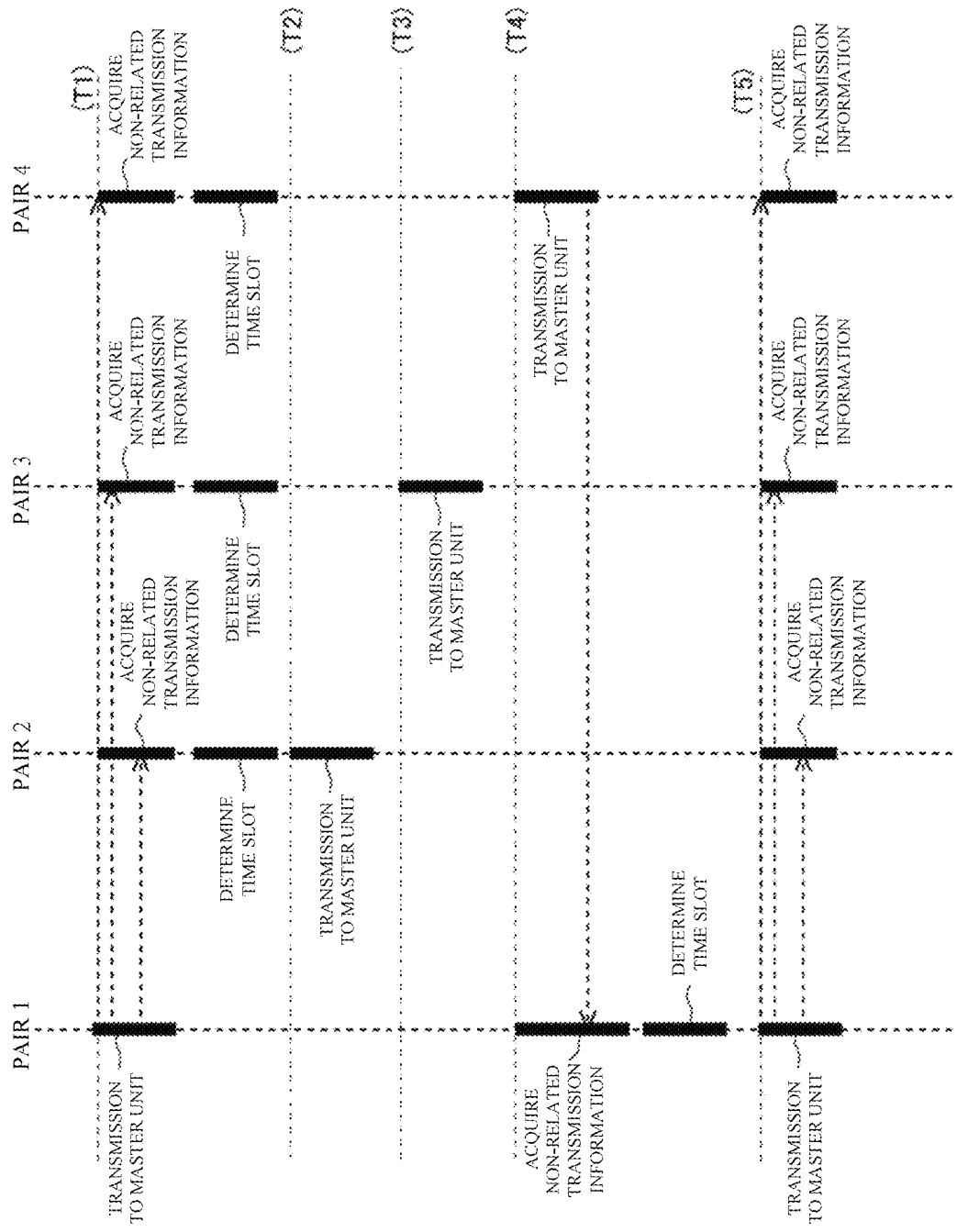
FIG. 5 is a first diagram illustrating the flow of information transmission/reception executed in the wireless information collection system illustrated in FIG. 1.

Here, the flow of the process of wireless transmission for collecting transmission information executed in the system 10 when the transmission process illustrated in FIG. 3 is executed by each of the wireless slave units 1a to 4a respectively included in the information collection pairs 1 to 4 will be described with reference to FIG. 5. In FIG. 5, each of axes of the pairs 1 to 4 illustrates the process of a wireless slave unit included in each information collection pair. In the flow illustrated in FIG. 5, at time T1, transmission information is wirelessly transmitted from the wireless slave unit 1a of the information collection pair 1 to the master unit 1b. It is apparent that this wireless transmission is executed according to the transmission process illustrated in FIG. 3. Then, in correspondence with wireless transmission of transmission information executed by the wireless slave unit 1a, the acquisition unit 152 included in each of the wireless slave unit 2a of the information collection pair 2, the wireless slave unit 3a of the information collection pair 3, and the wireless slave unit 4a of the information collection pair 4 acquires the transmission information at the same time as non-related transmission information of each of the wireless slave units.

Figure 6:
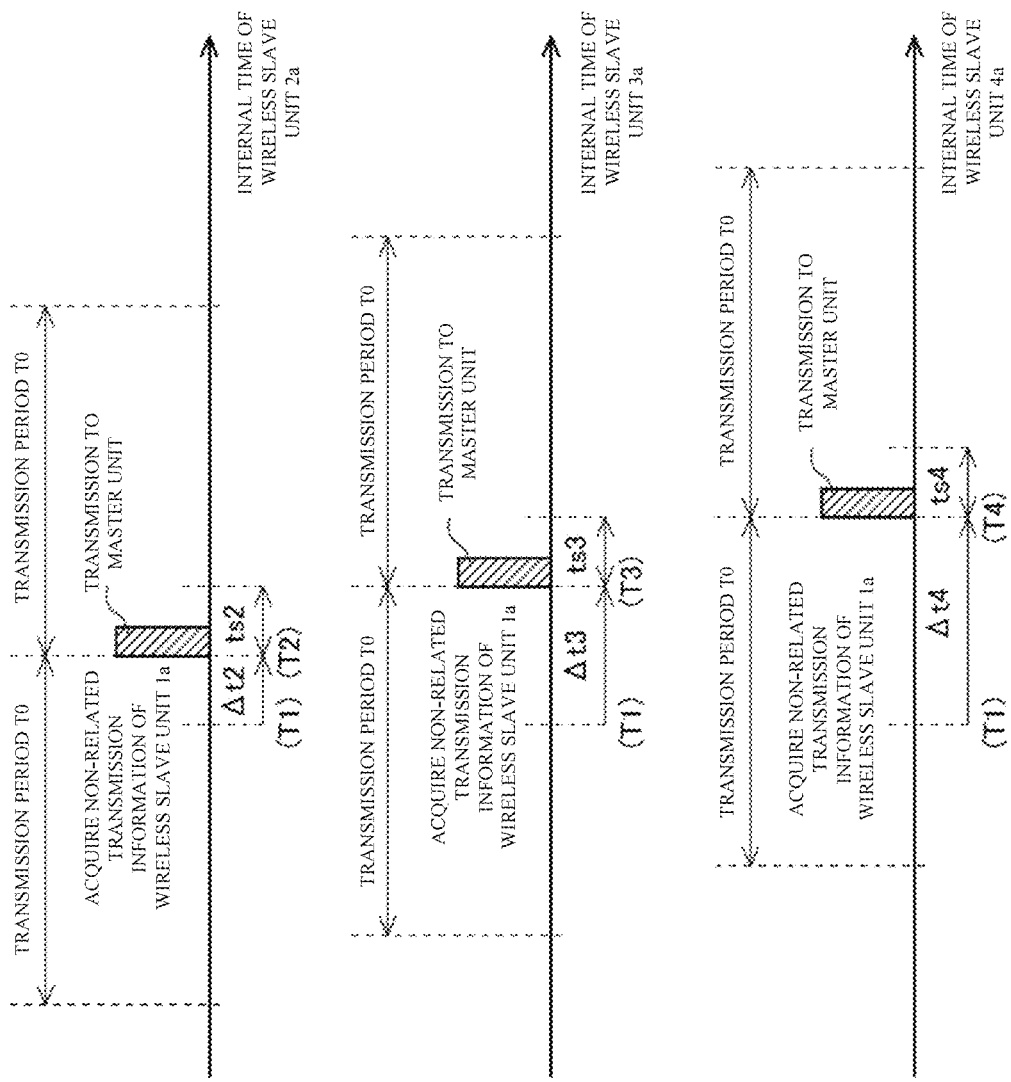
FIG. 6 is a diagram illustrating the timings of wireless transmission to a master unit executed by wireless slave units $2a$ to $4a$ corresponding to wireless communication devices according to the present invention in the information transmission/reception illustrated in FIG. 5.

Then, in each of the wireless slave units 2a to 4a that have received the non-related transmission information, the time slot determining unit 153 determines a time slot used for each wireless slave unit. Here, correlations between the acquisition time T1 of the non-related transmission information and determined time slots ts2 to ts4 in the wireless slave units 2a to 4a are illustrated in FIG. 6. In FIG. 6, a correlation for the wireless slave unit 2a is illustrated in an upper stage, a correlation for the wireless slave unit 3a is illustrated in a middle stage, and a correlation for the wireless slave unit 4a is illustrated in a lower stage. As illustrated in the transmission sequence information illustrated in FIG. 4, the wireless slave unit 2a is configured to execute wireless transmission after the wireless slave unit 1a. Thus, by using the acquisition time T1 of the non-related transmission information from the wireless slave unit 1a as a reference, a period of 10 msec (corresponding to 10 clocks) starting from time T2 that is after 10 msec ($\Delta t2$ in the drawing; corresponding to 10 clocks) that is the length of a time slot corresponding to one wireless slave unit is determined as a time slot ts2 for the wireless transmission of the wireless slave unit 2a. Then, the starting point of the counting of the internal timer unit 154 of the wireless slave unit 2a is corrected to the time T2.

Then, similarly, for the wireless slave unit 3a, in consideration of the transmission sequence information illustrated in FIG. 4, by using the acquisition time T1 of the non-related transmission information from the wireless slave unit 1a as a reference, a period of 10 msec (corresponding to 10 clocks) starting from time T3 that is after 20 msec ($\Delta t3$ in the drawing; corresponding to 20 clocks) that is the length of time slots corresponding to two wireless slave units is determined as a time slot ts3 for the wireless transmission of the wireless slave unit 3a. Then, the starting point of the counting of the internal timer unit 154 of the wireless slave unit 3a is corrected to the time T3. In addition, similarly, for the wireless slave unit 4a, in consideration of the transmission sequence information illustrated in FIG. 4, by using the acquisition time T1 of the non-related transmission information from the wireless slave unit 1a as a reference, a period of 10 msec (corresponding to 10 clocks) starting from time T4 that is after 30 msec ($\Delta t4$ in the drawing; corresponding to 30 clocks) that is the length of time slots corresponding to three wireless slave units is determined as a time slot ts4 for the wireless transmission of the wireless slave unit 4*a*. Then, the starting point of the counting of the internal timer unit 154 of the wireless slave unit 4*a* is corrected to the time T4.

Then, at time T2, T3, and T4 included in the time slots ts2, ts3, and ts4 determined in this way, the wireless slave units 2*a* to 4*a* wirelessly transmit the transmission information to the corresponding master units 2*b* to 4*b*. Here, in response to the wireless transmission of the transmission information executed by the wireless slave unit 4*a* at time T4, the acquisition unit 152 included in the wireless slave unit 1*a* of the information collection pair 1 acquires the transmission information as the non-related transmission information at the same time, and thereafter, the time slot determining unit 153 determines a time slot for wireless transmission executed by the next wireless slave unit 1*a*. A correlation between the acquisition time T4 of the non-related transmission information and each determined time slot ts1 in the wireless slave unit 1*a* at this time is illustrated in an upper stage in FIG. 7. As illustrated in the transmission sequence information illustrated in FIG. 4, the wireless slave unit 1*a* is configured to execute wireless transmission after the wireless slave unit 4*a*. Thus, by using the acquisition time T4 of the non-related transmission information from the wireless slave unit 4*a* as a reference, a period of 10 msec (corresponding to 10 clocks) starting from time T5 that is after 10 msec (Δt1 in the drawing; corresponding to 10 clocks) that is the length of a time slot corresponding to one wireless slave unit is determined as a time slot ts1 for wireless transmission executed by the wireless slave unit 1*a*. Then, the starting point of the counting of the internal timer unit 154 of the wireless slave unit 1*a* is corrected to the time T5.

Figure 7:
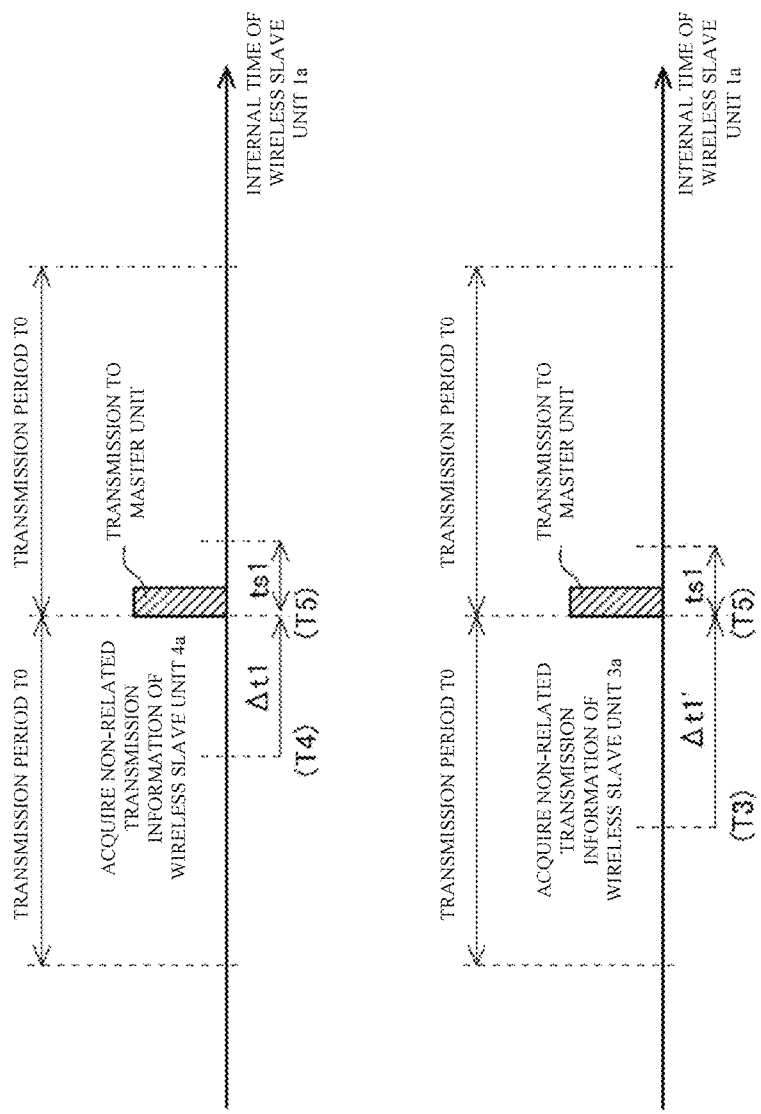
FIG. 7 is a diagram illustrating the timings of wireless transmission to a master unit executed by a wireless slave unit $1a$ corresponding to a wireless communication device according to the present invention in the information transmission/reception illustrated in FIG. 5.

In addition, a lower stage illustrated in FIG. 7 illustrates a correlation between the acquisition time T3 of non-related transmission information and each determined time slot ts1 of a case in which the acquisition unit 152 included in the wireless slave unit 1*a* of the information collection pair 1 acquires the transmission information according to the wireless slave unit 3*a* as non-related transmission information, and thereafter, the time slot determining unit 153 determines a time slot for the wireless transmission executed by the next wireless slave unit 1*a*. Also in this case, the time slot ts1 is determined on the basis of the transmission sequence information illustrated in FIG. 4 and thus coincides with the time slot ts1 illustrated in the upper stage in FIG. 7. Then, at the time T5 included in the time slot is 1 determined in this way, the wireless slave unit 1*a* wirelessly transmits the transmission information to the master unit 1*b*.

Other Example

Figure 8:
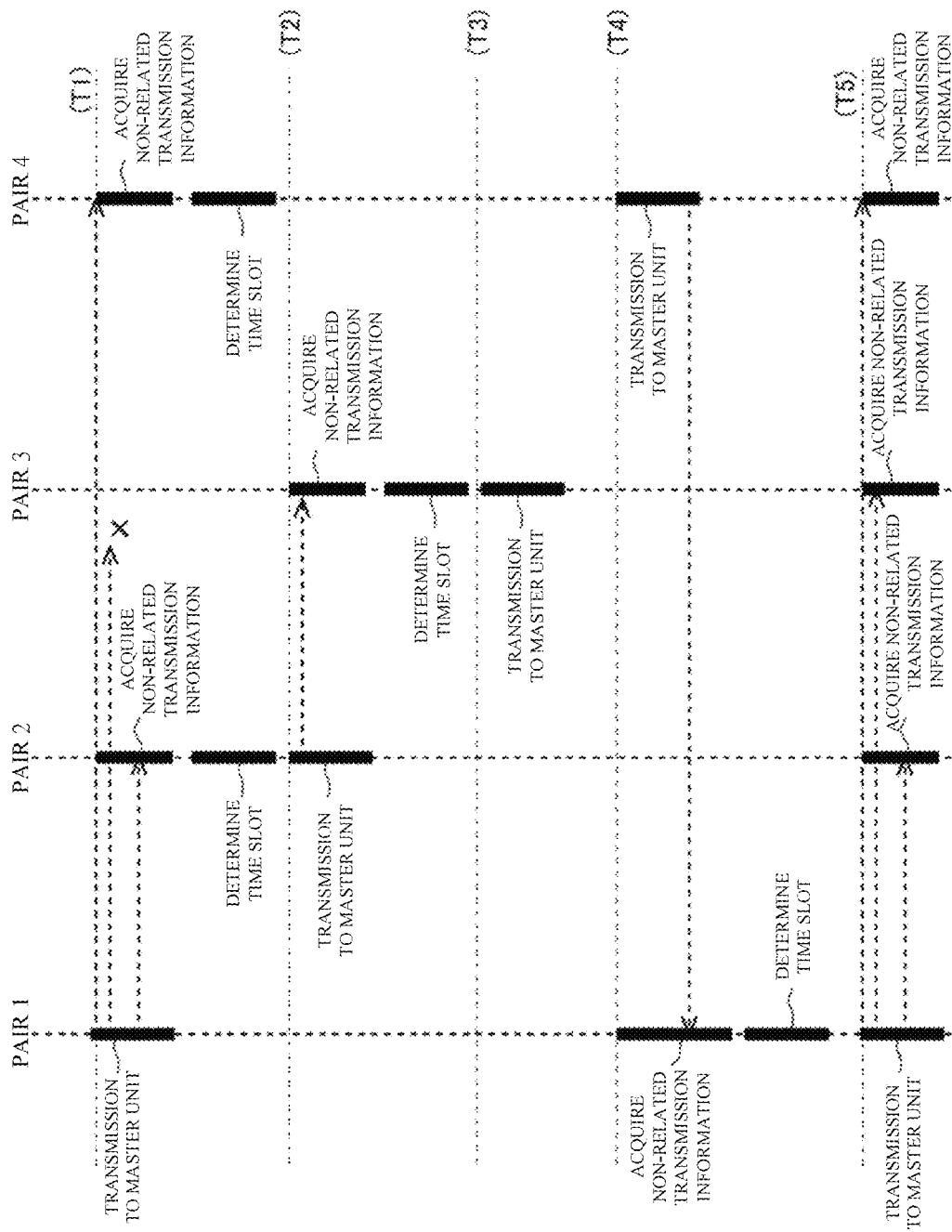
FIG. 8 is a second diagram illustrating the flow of information transmission/reception executed by the wireless information collection system illustrated in FIG. 1.

Another flow of the wireless transmission of transmission information in the system 10 will be described with reference to FIG. 8. In the flow of the process illustrated in FIG. 8, the wireless slave unit 3*a* of the information collection pair 3 cannot acquire non-related transmission information at time T1, which is different from the flow of the process illustrated in FIG. 5. In the flow of the process illustrated in FIG. 8, as illustrated in FIG. 5, transmission information is wirelessly transmitted from the wireless slave unit 1*a* to the master unit 1*b* thereof at time T1 in the information collection pair 1. At this time, while the wireless slave unit 2*a* of the information collection pair 2 and the wireless slave unit 4*a* of the information collection pair 4 are assumed to succeed in the acquisition of the transmission information as non-related transmission information, the wireless slave unit 3*a* of the information collection pair 3 is assumed to fail in the acquisition. Examples of factors for the acquisition failure include shadowing according to the robot group 21 and the like. Accordingly, in each of the wireless slave unit 2*a* and the wireless slave unit 4*a*, after acquiring the non-related transmission information, the time slot determining unit 153 can determine a time slot for wireless transmission. However, in the wireless slave unit 3*a*, the determination of a time slot is not immediately executed.

Even in such a case, when the wireless transmission (wireless transmission at time T2) executed by the wireless slave unit 2*a* in the determined time slot is executed, in a case in which the transmission information from the wireless slave unit 2*a* is acquired on the wireless slave unit 3*a* side as non-related transmission information, the time slot determining unit 153 of the wireless slave unit 3*a* can determine a time slot for wireless transmission thereafter, and the transmission information can be wirelessly transmitted to the master unit 3*b* at time T3.

In this way, even when the acquisition of the transmission information from a certain wireless slave unit as non-related transmission information has failed once, in a case in which there is still a chance for the acquisition of transmission information from another wireless slave unit, there is a possibility that interferences between wireless slave units can be avoided in the wireless communication using a predetermined time-division multiple access system, and thus, such a wireless slave unit attempts the acquisition of non-related transmission information again. In addition, even in a case in which transmission information from any other wireless slave unit could not be acquired as non-related transmission information until wireless transmission is executed from the own device, a substitution timing is determined in the process of S109 illustrated in FIG. 3, and accordingly, wireless transmission of the transmission information can be executed relatively stably.

<Group Registering Process>

Figure 9:
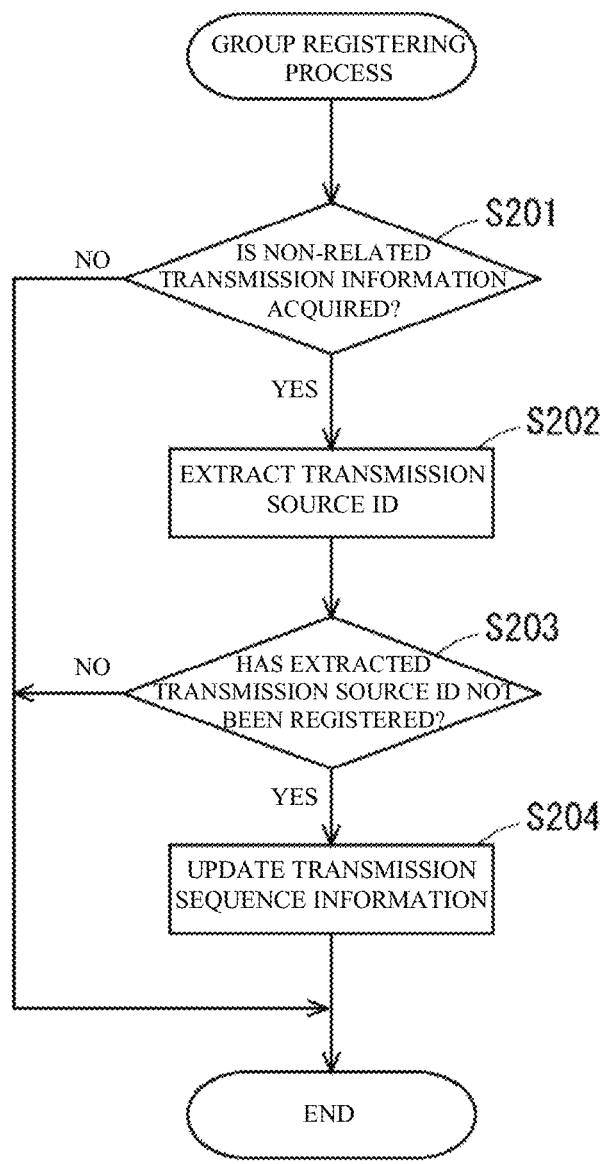
FIG. 9 is a flowchart of a group registering process executed by a wireless communication device according to the present invention.

Here, in the information maintaining unit 151 of each wireless slave unit, the transmission sequence information illustrated in FIG. 3 is maintained. As described above, information relating to a transmission sequence is stored together with the identification information of the wireless slave unit in the transmission sequence information, a time slot relating to wireless communication between wireless slave units according to a predetermined time-division multiple access system can be determined. Accordingly, a wireless slave unit not registered in this transmission sequence information cannot execute wireless communication avoiding interferences within the system 10. Thus, a group registering process of updating the transmission sequence information included in each wireless slave unit already participating in the system 10 such that a new wireless slave unit can execute wireless communication avoiding interferences within the system 10 in accordance with a predetermined time-division multiple access system will be described with reference to FIG. 9. The group registering process is realized by executing a predetermined control program in each wireless slave unit.

First, in S201, it is determined whether or not non-related transmission information has been acquired by the acquisition unit 152 of each wireless slave unit. In a case in which "Yes" is determined in S201, the process proceeds to S202 and the identification information of the wireless slave unit that is the transmission source included in the non-related transmission information acquired in S202 is extracted. On the other hand, in a case in which "No" is determined in S201, this process ends. After the extraction of S202, in S203, it is determined whether or not the extracted identification information is included in the transmission sequence information that is currently maintained by the information maintaining unit 151, in other words, whether or not the extracted identification information is information of a wireless slave unit of which participation in the system 10 has not been registered. In a case in which "Yes" is determined in S203, the process proceeds to S204. On the other hand, in a case in which "No" is determined in S203, this process ends. Then, in S204, the transmission sequence information that is currently maintained is updated. In other words, the identification information of a wireless slave unit to newly participate in the system 10 is added to the transmission sequence information included in each wireless slave unit. The transmission sequence of the newly added wireless slave unit is set as the latest sequence in the transmission sequence information. In addition, the transmission sequence information until now is transmitted from a wireless slave unit that has already participated to a new wireless slave unit to newly participate in the system 10, and the new wireless slave unit adds the information of the own device thereto to form transmission sequence information required for participating in the system 10.

In this way, by updating the transmission sequence information at appropriate time, the system 10 can be flexibly formed, and the collection of information from each information collection pair can be smoothly realized.

Embodiment 2

Figure 10:
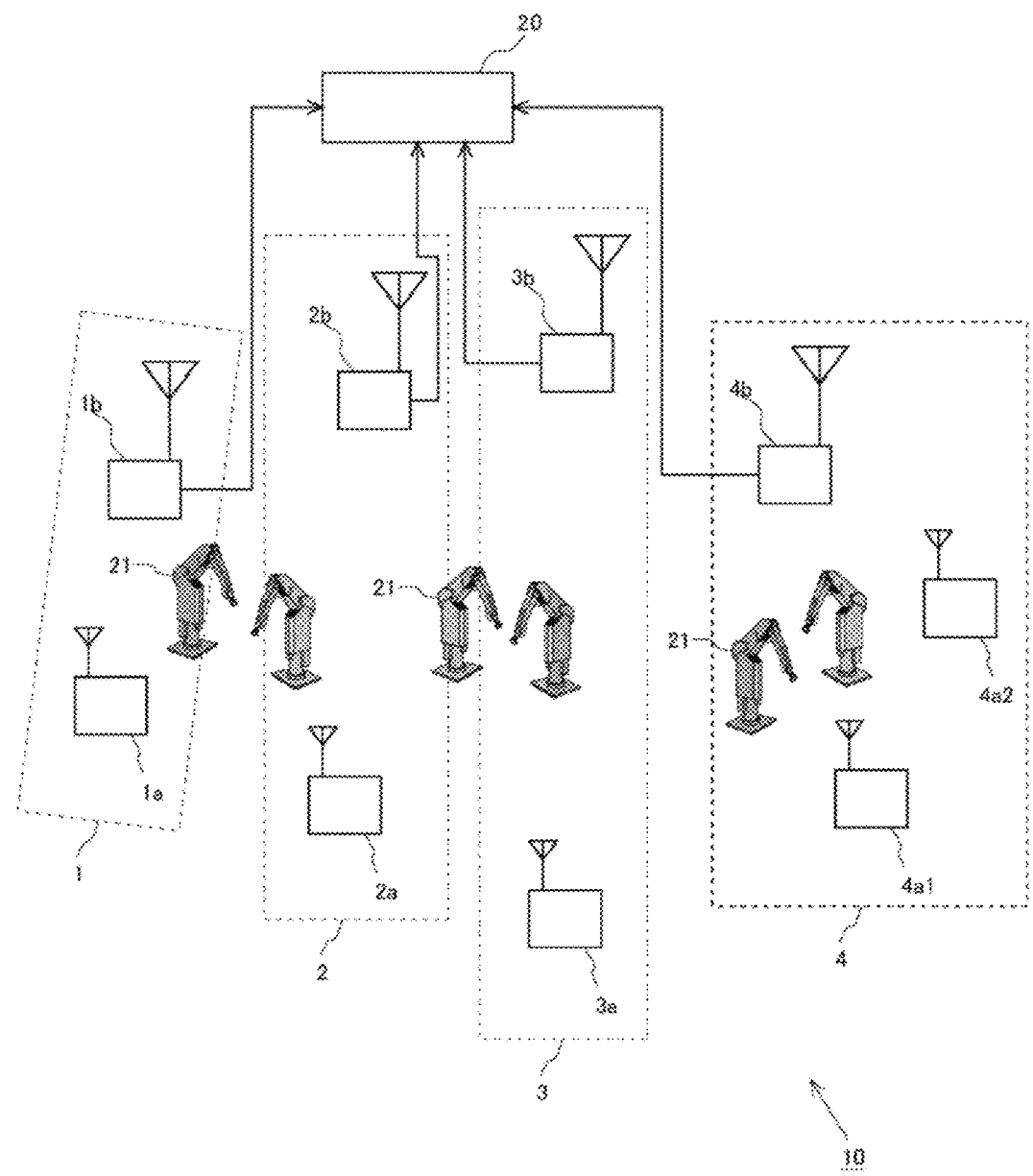
FIG. 10 is a diagram illustrating a schematic configuration of a wireless information collection system including a wireless communication device according to a second embodiment of the present invention.

Here, FIG. 10 illustrates a schematic configuration of a system 10 according to a second embodiment of the present invention. In the configuration of the system 10 illustrated in FIG. 10, the same reference numeral will be assigned to a component that is substantially the same as that of the configuration of the system 10 illustrated in FIG. 1, and detailed description thereof will not be presented. Here, a difference between the system 10 illustrated in FIG. 10 and the system 10 illustrated in FIG. 1 is a configuration relating to the information collection pair 4. More specifically, in the system 10 illustrated in FIG. 10, an information collection pair 4 includes two wireless slave units 4a1 and 4a2 and a master unit 4b that is common thereto. Accordingly, transmission information from each of the wireless slave units 4a1 and 4a2 is wirelessly transmitted to the common master unit 4b in accordance with a predetermined time-division multiple access system and is collected in an information processing device 20. Each wireless slave unit participating in such a system 10 includes transmission sequence information relating to the transmission sequences of all the participating wireless slave units, and the transmission process illustrated in FIG. 3 is executed in each of the wireless slave units including the wireless slave units 4a1 and 4a2, whereby wireless transmission of the transmission information capable of avoiding interferences is realized.

Figure 11:
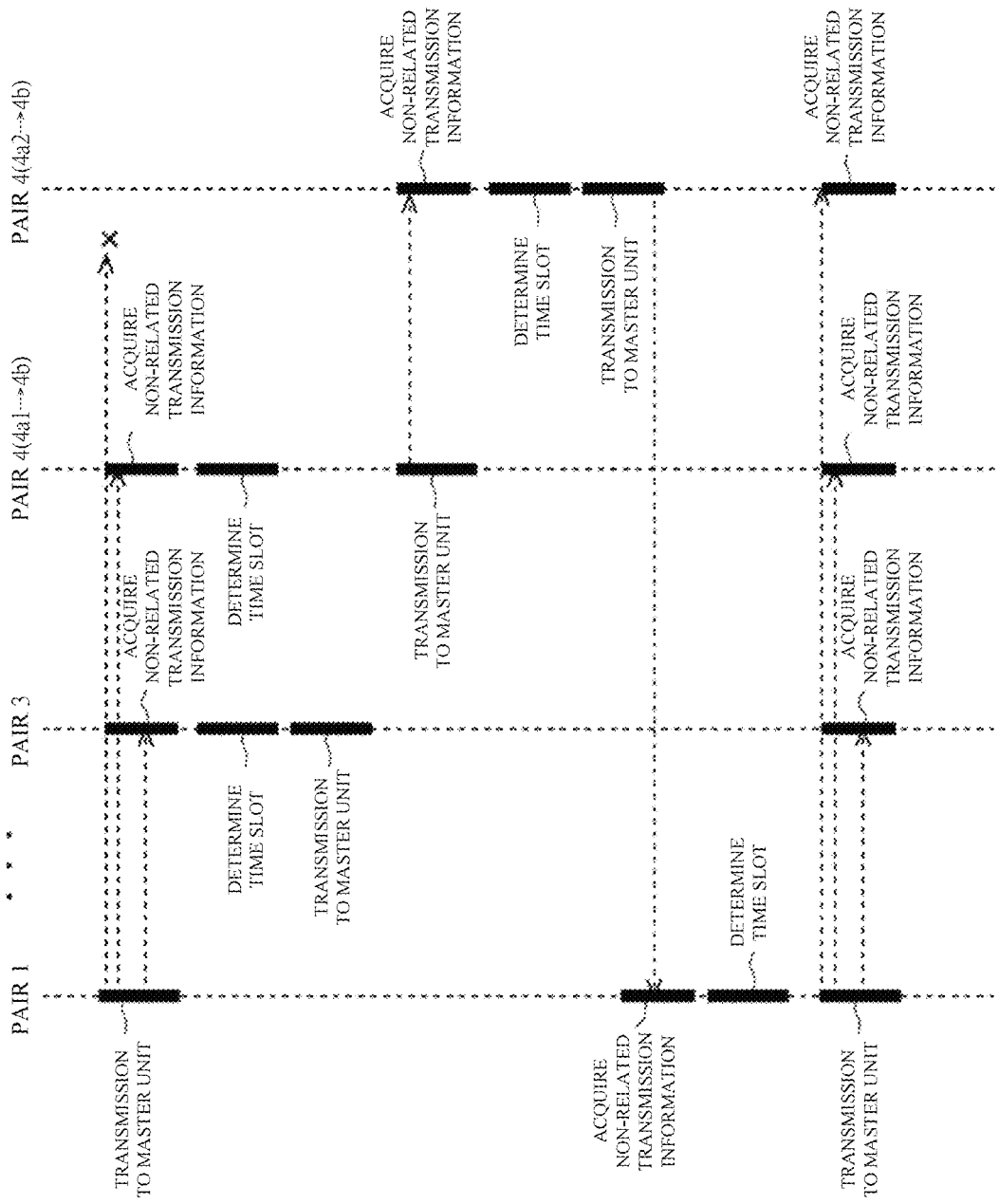
FIG. 11 is a diagram illustrating the flow of information transmission/reception executed in the wireless information collection system illustrated in FIG. 10.

FIG. 11 illustrates the flow of the process of wireless transmission for collecting transmission information that is executed in the system 10 illustrated in FIG. 10. In FIG. 11, for the convenience of description, an information collection pair 2 is omitted. In the flow of the process illustrated in FIG. 11, when transmission information is transmitted from the wireless slave unit 1a of the information collection pair 1 to the master unit 1b, other wireless slave units attempt to acquire the transmission information as non-related transmission information. As a result, wireless slave units other than a wireless slave unit 4a2 of an information collection pair 4 are assumed to succeed in the acquisition, and the wireless slave unit 4a2 is assumed to fail in the acquisition thereof. For this reason, the wireless slave unit 4a2 cannot determine a time slot thereof using the transmission information from the wireless slave unit 1a as non-related transmission information.

However, in the flow of the process illustrated in FIG. 11, the wireless slave unit 4a2 acquires transmission information that is transmitted by the wireless slave unit 4a1 belonging to the same information collection pair 4 to the master unit 4b as non-related transmission information and determines a time slot on the basis thereof. In other words, while the transmission information from the wireless slave unit 4a1 is transmission information of the wireless slave unit 4a2 for the common master unit 4b, such transmission information also can be used as non-related transmission information for determining a time slot. In the flow of the process illustrated in FIG. 11, the transmission information transmitted from the wireless slave unit 4a2 to the master unit 4b is acquired as non-related transmission information in the wireless slave unit 1a and is provided for determining a time slot used for wireless transmission executed thereafter.

Modified Example

A modified example of the present invention will be described on the basis of the system 10 illustrated in FIG. 1. Each wireless slave unit executes the wireless transmission process in the time slot determined as above in accordance with time counted by an internal timer unit 154 thereof (hereinafter, referred to as "internal time"). Here, since the internal time of each wireless slave unit is independently counted, there is a possibility that a deviation occurs in the internal time. In a state in which a deviation occurs in the internal time in this way, even in a case in which wireless transmission is executed in accordance with a time slot determined by the time slot determining unit 153, there is a possibility that times in which wireless communication is executed overlap each other, and thereby interferences occur.

In order to avoid interferences of wireless transmission due to a deviation of the internal time between the wireless slave units, a guard time GT in which wireless transmission process is not executed in a determined time slot can be set. For example, when a maximum time deviation amount of each wireless slave unit is $\Delta t$, a maximum time deviation amount $\Delta T$ according to four wireless slave units present in the system 10 is $\Delta T = \Delta t \times 4$. Thus, by setting a guard time GT exceeding $\Delta T$ within the determined time slot, interferences in wireless communication can be avoided. In addition, the maximum time deviation amount $\Delta t$ of an individual body is regarded as a maximum value of each deviation amount accumulated within a predetermined period in which time correction is made among wireless slave units in the system 10. Setting of the guard time GT in this way is useful for avoiding the interference of wireless transmission to some degrees.

The invention claimed is:

1. A wireless communication device that is configured to wirelessly transmit predetermined information included in the own device to a master unit corresponding to the own device at a predetermined transmission period, the wireless transmission being executed according to a predetermined time-division multiple access system, the wireless communication device comprising:

an information maintaining unit that maintains transmission sequence information of one or a plurality of wireless slave units configured to wirelessly transmit information included in the one or plurality of wireless slave units to master units corresponding to the one or plurality of wireless slave units from the one or plurality of wireless slave units other than the wireless communication device in accordance with the predetermined time-division multiple access system and the wireless communication device relating to sequences of wireless transmission in the predetermined time-division multiple access system;

an acquisition unit that acquires non-related transmission information when the wireless communication between a predetermined wireless slave unit and a master unit corresponding to the predetermined wireless slave unit is executed, wherein the non-related information is transmission information wirelessly transmitted from the predetermined wireless slave unit included in the one or plurality of wireless slave units to the master unit corresponding to the predetermined wireless slave unit in accordance with the predetermined time-division multiple access system, and the non-related transmission information includes identification information used for identifying the predetermined wireless slave unit, wherein the wireless communication is a process of executing wireless transmission of transmission information;

a time slot determining unit that determines a predetermined time slot used for the wireless communication device to transmit the predetermined information to a master unit corresponding to the own device in accordance with the predetermined time-division multiple access system on the basis of the identification information included in the non-related transmission information acquired by the acquisition unit, an acquisition time of the non-related transmission information, and the transmission sequence information maintained by the information maintaining unit; and a transmission unit that transmits the predetermined information to the master unit corresponding to the own device in the predetermined time slot determined by the time slot determining unit.

2. The wireless communication device according to claim 1, wherein the non-related transmission information is transmission information in which the master unit corresponding to the own device is not set as a transmission destination.

3. The wireless communication device according to claim 1, wherein, after the time slot determining unit determines the predetermined time slot, the transmission unit transmits the predetermined information to the master unit corresponding to the own device in the predetermined time slot within one cycle of the predetermined transmission period of the own device.

4. The wireless communication device according to claim 1, further comprising an internal timer unit that counts time within the own device, wherein the acquisition time of the non-related transmission information is a time acquired by counting the acquisition time of the non-related transmission information acquired by the acquisition unit by using the internal timer unit, and wherein the time slot determining unit recognizes the predetermined wireless slave unit that is a transmission source of the non-related transmission information on the basis of the identification information included in the non-related transmission information and determines the predetermined time slot within the predetermined transmission period of the own device that is counted by the internal timer unit on the basis of a correlation between the predetermined wireless slave unit and the own device in the transmission sequence information and the acquisition time.

5. The wireless communication device according to claim 4, further comprising a substitution determining unit that determines a substitution transmission timing for the wireless communication device to transmit the predetermined information to the master unit corresponding to the own device substituting the predetermined time slot on the basis of the time counted by the internal timer unit in a case in which all the non-related transmission information of the one or plurality of wireless slave units cannot be acquired by the acquisition unit in one cycle of the predetermined transmission period of the own device.

6. The wireless communication device according to claim 1, wherein, in a case in which information relating to the predetermined wireless slave unit recognized on the basis of the identification information included in the non-related transmission information acquired by the acquisition unit is not included in the transmission sequence information that is already included in the information maintaining unit, the information maintaining unit updates the transmission sequence information on the basis of the acquired non-related transmission information and maintains the transmission sequence information after the update.

7. The wireless communication device according to claim 1, wherein the wireless communication device is configured to have a master unit that is a transmission destination of the wireless transmission according to the predetermined time-division multiple access system to be common with at least one wireless slave unit among the one or plurality of wireless slave units, and wherein the acquisition unit acquires the non-related transmission information transmitted from the at least one wireless slave unit to the common master in accordance with the predetermined time-division multiple access system.

8. A wireless information collection system that includes a plurality of sets of a wireless communication combination, which is configured to wirelessly transmit predetermined information included in an own device to a master unit corresponding to the own device at a predetermined period, formed by a wireless communication device and a master unit thereof, and the wireless transmission executed in accordance with a predetermined time-division multiple access system, wherein each wireless communication device of the plurality of sets includes:

an information maintaining unit that maintains transmission sequence information of one or a plurality of wireless slave units configured to wirelessly transmit information included in the one or plurality of wireless slave units to master units corresponding to the one or plurality of wireless slave units from the one or plurality of wireless slave units other than the wireless communication device in accordance with the predetermined time-division multiple access system and the wireless communication device relating to sequences of wireless transmission in the predetermined time-division multiple access system;

an acquisition unit that acquires non-related transmission information when the wireless communication between a predetermined wireless slave unit and a master unit corresponding to the predetermined wireless slave unit is executed, wherein the non-related information is transmission information wirelessly transmitted from the predetermined wireless slave unit included in the one or plurality of wireless slave units to the master unit corresponding to the predetermined wireless slave unit in accordance with the predetermined time-division multiple access system, and the non-related transmission information includes identification information used for identifying the predetermined wireless slave unit, wherein the wireless communication is a process of executing wireless transmission of transmission information;
    a time slot determining unit that determines a predetermined time slot used for the wireless communication device to transmit the predetermined information to a master unit corresponding to the own device in accordance with the predetermined time-division multiple access system on the basis of the identification information included in the non-related transmission information acquired by the acquisition unit, an acquisition time of the non-related transmission information, and the transmission sequence information maintained by the information maintaining unit; and
    a transmission unit that transmits the predetermined information to the master unit corresponding to the own device in the predetermined time slot determined by the time slot determining unit, and
    wherein each master unit of the plurality of sets includes a master unit-side transmission unit that transmits the predetermined information that is wirelessly transmitted from the wireless communication device corresponding to the master unit to a predetermined information processing device.

9. A wireless transmission method for wirelessly transmitting predetermined information included in a wireless communication device to a master unit corresponding to the own device at a predetermined transmission period,
    the wireless transmission being executed according to a predetermined time-division multiple access system,
    the wireless communication device maintaining transmission sequence information of one or a plurality of wireless slave units configured to wirelessly transmit information included in the one or plurality of wireless slave units to master units corresponding to the one or plurality of wireless slave units from the one or plurality of wireless slave units other than the wireless communication device in accordance with the predetermined time-division multiple access system and the wireless communication device relating to sequences of wireless transmission in the predetermined time-division multiple access system,
    the wireless transmission method comprising:
    acquiring information non-related transmission when the wireless communication between a predetermined wireless slave unit and a master unit corresponding to the predetermined wireless slave unit is executed, wherein the non-related information is transmission information wirelessly transmitted from the predetermined wireless slave unit included in the one or plurality of wireless slave units to the master unit corresponding to the predetermined wireless slave unit in accordance with the predetermined time-division multiple access system, and the non-related transmission information including identification information used for identifying the predetermined wireless slave unit, wherein the wireless communication is a process of executing wireless transmission of transmission information;
    determining a predetermined time slot used for the wireless communication device to transmit the predetermined information to a master unit corresponding to the own device in accordance with the predetermined time-division multiple access system on the basis of the identification information included in the acquired non-related transmission information, an acquisition time of the non-related transmission information, and the transmission sequence information maintained by the information maintaining unit; and
    transmitting the predetermined information to the master unit corresponding to the own device in the determined predetermined time slot.

10. The wireless communication device according to claim 2, wherein, after the time slot determining unit determines the predetermined time slot, the transmission unit transmits the predetermined information to the master unit corresponding to the own device in the predetermined time slot within one cycle of the predetermined transmission period of the own device.

11. The wireless communication device according to claim 2, further comprising an internal timer unit that counts time within the own device,
    wherein the acquisition time of the non-related transmission information is a time acquired by counting the acquisition time of the non-related transmission information acquired by the acquisition unit by using the internal timer unit, and
    wherein the time slot determining unit recognizes the predetermined wireless slave unit that is a transmission source of the non elated transmission information on the basis of the identification information included in the non-related transmission information and determines the predetermined time slot within the predetermined transmission period of the own device that is counted by the internal timer unit on the basis of a correlation between the predetermined wireless slave unit and the own device in the transmission sequence information and the acquisition time.

12. The wireless communication device according to claim 3, further comprising an internal timer unit that counts time within the own device,
    wherein the acquisition time of the non-related transmission information is a time acquired by counting the acquisition time of the non-related transmission information acquired by the acquisition unit by using the internal timer unit, and
    wherein the time slot determining unit recognizes the predetermined wireless slave unit that is a transmission source of the non-related transmission information on the basis of the identification information included in the non-related transmission information and determines the predetermined time slot within the predetermined transmission period of the own device that is counted by the internal timer unit on the basis of a correlation between the predetermined wireless slave unit and the own device in the transmission sequence information and the acquisition time.

13. The wireless communication device according to claim 2, wherein, in a case in which information relating to the predetermined wireless slave unit recognized on the basis of the identification information included in the non-related transmission information acquired by the acquisition unit is not included in the transmission sequence information that is already included in the information maintaining unit, the information maintaining unit updates the transmission sequence information on the basis of the acquired non-related transmission information and maintains the transmission sequence information after the update.

14. The wireless communication device according to claim 3, wherein, in a case in which information relating to the predetermined wireless slave unit recognized on the basis of the identification information included in the non-related transmission information acquired by the acquisition unit is not included in the transmission sequence information that is already included in the information maintaining unit, the information maintaining unit updates the transmission sequence information on the basis of the acquired non-related transmission information and maintains the transmission sequence information after the update.

15. The wireless communication device according to claim 4, wherein, in a case in which information relating to the predetermined wireless slave unit recognized on the basis of the identification information included in the non-related transmission information acquired by the acquisition unit is not included in the transmission sequence information that is already included in the information maintaining unit, the information maintaining unit updates the transmission sequence information on the basis of the acquired non-related transmission information and maintains the transmission sequence information after the update.

16. The wireless communication device according to claim 5, wherein, in a case in which information relating to the predetermined wireless slave unit recognized on the basis of the identification information included in the non-related transmission information acquired by the acquisition unit is not included in the transmission sequence information that is already included in the information maintaining unit, the information maintaining unit updates the transmission sequence information on the basis of the acquired non-related transmission information and maintains the transmission sequence information after the update.

* * * * *